(12) United States Patent
Carter, Jr.

(10) Patent No.: US 10,370,815 B2
(45) Date of Patent: Aug. 6, 2019

(54) METHOD OF FORMING SUBTERRANEAN BARRIERS WITH MOLTEN WAX

(71) Applicant: Ernest E. Carter, Jr., Sugar Land, TX (US)

(72) Inventor: Ernest E. Carter, Jr., Sugar Land, TX (US)

( * ) Notice: Subject to any disclaimer, the term of this patent is extended or adjusted under 35 U.S.C. 154(b) by 0 days.

(21) Appl. No.: 14/563,734

(22) Filed: Dec. 8, 2014

(65) Prior Publication Data

US 2015/0184354 A1    Jul. 2, 2015

Related U.S. Application Data

(62) Division of application No. 13/784,342, filed on Mar. 4, 2013, now Pat. No. 8,905,679, which is a division
(Continued)

(51) Int. Cl.
*B65G 5/00* (2006.01)
*E02D 19/16* (2006.01)
(Continued)

(52) U.S. Cl.
CPC ............ *E02D 19/16* (2013.01); *B09B 1/00* (2013.01); *B09C 1/00* (2013.01); *E02D 3/12* (2013.01);
(Continued)

(58) Field of Classification Search
CPC ...... E02D 31/002; E02D 19/12; E21B 33/138
See application file for complete search history.

(56) References Cited

U.S. PATENT DOCUMENTS

| 2,201,096 A | 5/1940 | Kerman |
| 2,779,416 A | 1/1957 | Clark, Jr. et al. |

(Continued)

FOREIGN PATENT DOCUMENTS

EP    0317369 A2    5/1989

OTHER PUBLICATIONS

PCT Application No. US2007/020064; Written Opinion of the International Searching Authority for Applicant Ernest E. Carter, Jr. dated Mar. 14, 2009.

*Primary Examiner* — Tara Mayo-Pinnock
(74) *Attorney, Agent, or Firm* — Jones Walker LLP

(57) ABSTRACT

A method of permeating and infusing a formation around the borehole with wax by heating a formation surrounding a borehole and pumping molten wax into the formation, wherein the molten wax flows into and fills voids the formation without disrupting the formation is described. Also, a method of permeating and infusing a formation around the borehole with wax by heating a formation surrounding a borehole, pumping molten wax into the borehole, heating and circulating the molten wax vertically within the borehole for an extended period using a heater and pump attached to a circulation pipe extended to the bottom of a zone of the borehole to be heated, and recovering molten wax from the borehole by displacing it back to the surface with another material of different density is described. Additionally, a method of forming subterranean barriers by drilling multiple closely-spaced boreholes along a subterranean boundary, treating the boreholes with infusions of molten wax, and forming a hydraulic barrier along said boundary is described.

22 Claims, 11 Drawing Sheets

Related U.S. Application Data of application No. 12/440,742, filed as application No. PCT/US2007/020064 on Sep. 14, 2007, now Pat. No. 8,387,688.

(60) Provisional application No. 60/844,432, filed on Sep. 14, 2006.

(51) Int. Cl.

| | | |
|---|---|---|
| *B09B 1/00* | (2006.01) | |
| *B09C 1/00* | (2006.01) | |
| *E02D 19/12* | (2006.01) | |
| *E02D 31/00* | (2006.01) | |
| *E21B 33/138* | (2006.01) | |
| *E21B 43/241* | (2006.01) | |
| *E21B 43/30* | (2006.01) | |
| *E02D 3/12* | (2006.01) | |
| *E02D 31/02* | (2006.01) | |

(52) U.S. Cl.
CPC ............ *E02D 19/12* (2013.01); *E02D 31/002* (2013.01); *E02D 31/02* (2013.01); *E21B 33/138* (2013.01); *E21B 43/241* (2013.01); *E21B 43/30* (2013.01)

(56) References Cited

U.S. PATENT DOCUMENTS

| | | | |
|---|---|---|---|
| 2,799,341 A | | 7/1957 | Maly |
| 2,801,699 A | | 8/1957 | Sayre, Jr. et al. |
| 3,011,342 A | | 12/1961 | Simm |
| 4,057,969 A | * | 11/1977 | Rochmann .................... 405/267 |
| 4,265,310 A | | 5/1981 | Britton et al. |
| 4,697,953 A | * | 10/1987 | Nussbaumer et al. ..... 405/129.6 |
| 4,787,449 A | | 11/1988 | Jones |
| 4,842,070 A | | 6/1989 | Sharp |
| 4,900,196 A | * | 2/1990 | Bridges ......................... 405/267 |
| 4,943,189 A | * | 7/1990 | Verstraeten ................... 405/267 |
| 5,013,185 A | * | 5/1991 | Taki ......................... 405/128.45 |
| 5,405,225 A | | 4/1995 | Bilkenroth et al. |
| 5,427,475 A | * | 6/1995 | Coss ........................ E21B 7/205 |
| | | | 175/53 |
| 5,542,782 A | | 8/1996 | Carter, Jr. et al. |
| 5,765,965 A | * | 6/1998 | Carter et al. ............. 405/129.65 |
| 5,816,748 A | * | 10/1998 | Kleiser et al. ................. 405/268 |
| 5,879,110 A | * | 3/1999 | Carter, Jr. ...................... 405/267 |
| 5,890,840 A | | 4/1999 | Carter, Jr. |
| 5,957,624 A | * | 9/1999 | Carter et al. ................ 405/129.6 |
| 6,357,968 B1 | * | 3/2002 | Dwyer et al. ................. 405/269 |
| 2002/0009331 A1 | * | 1/2002 | Carter, Jr. ................. B09B 1/00 |
| | | | 405/129.55 |
| 2003/0205174 A1 | * | 11/2003 | Carter, Jr. ................. B09B 1/00 |
| | | | 106/724 |
| 2005/0074291 A1 | * | 4/2005 | Carter, Jr. ............... B08B 17/00 |
| | | | 405/129.2 |
| 2009/0301714 A1 | | 12/2009 | Bragg et al. |

\* cited by examiner

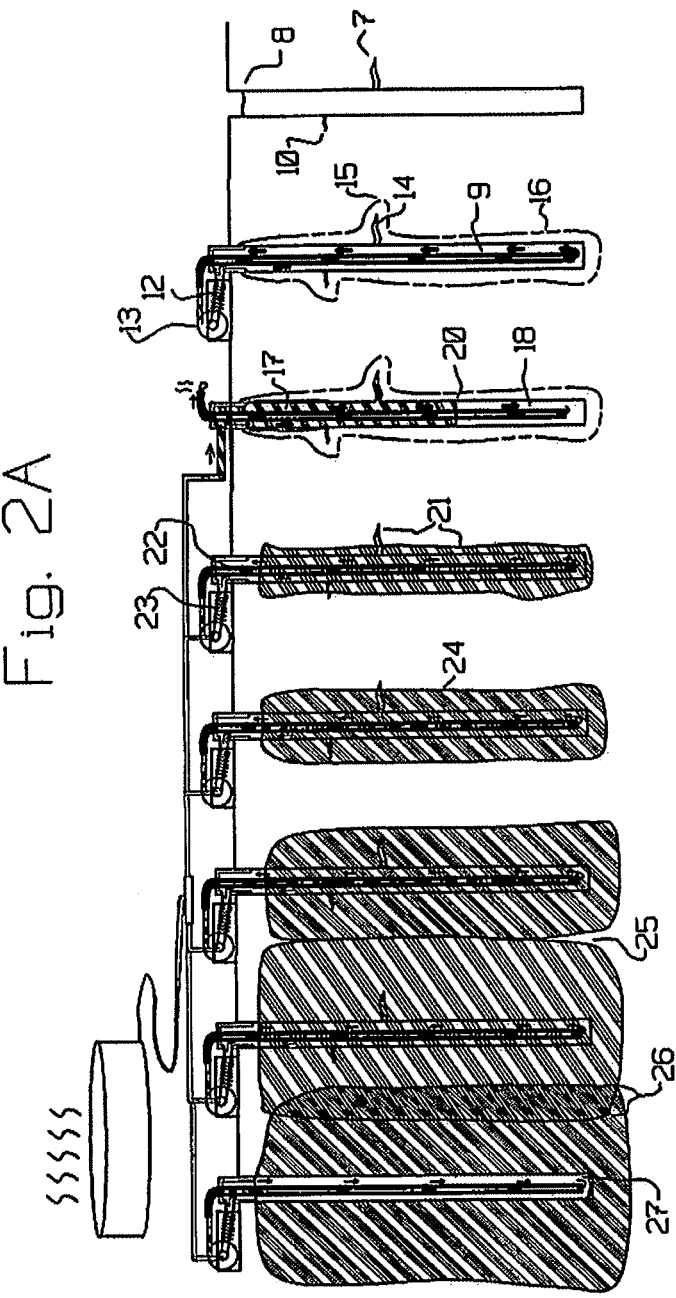
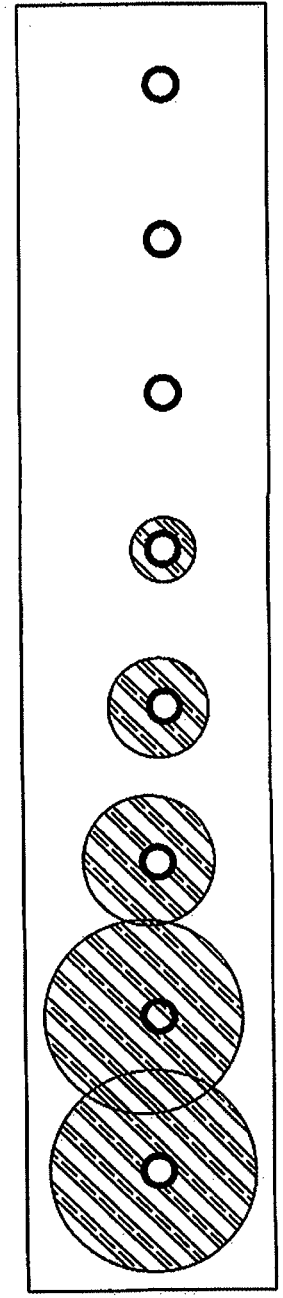

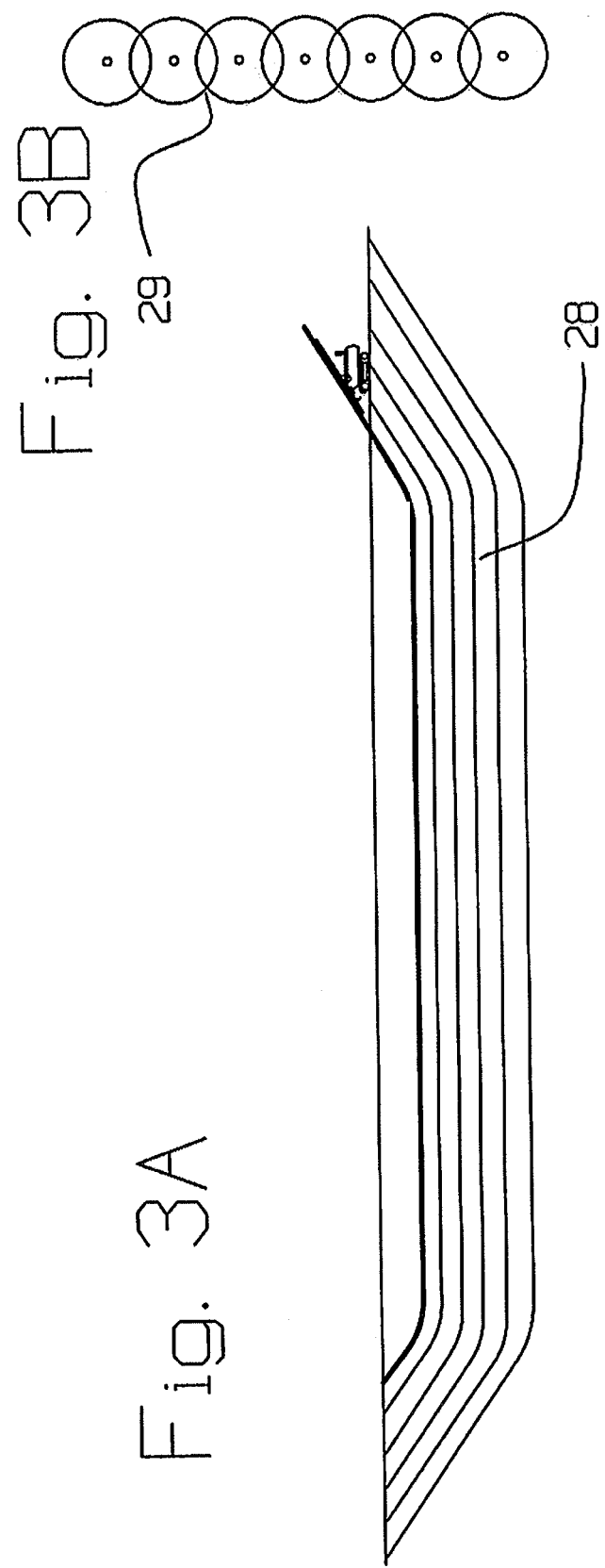

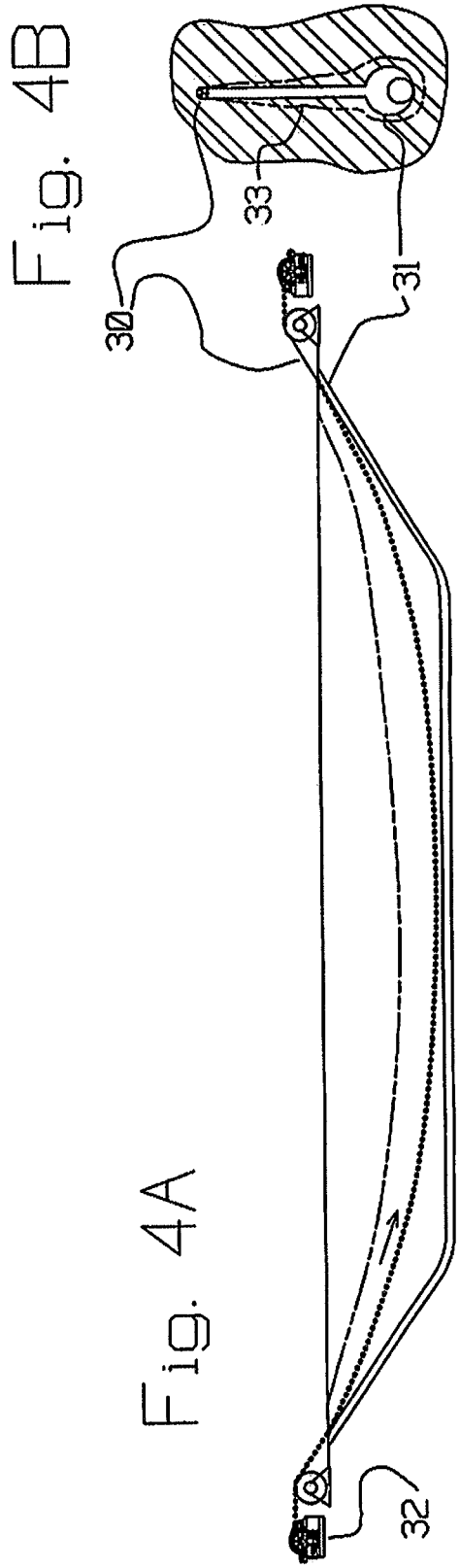

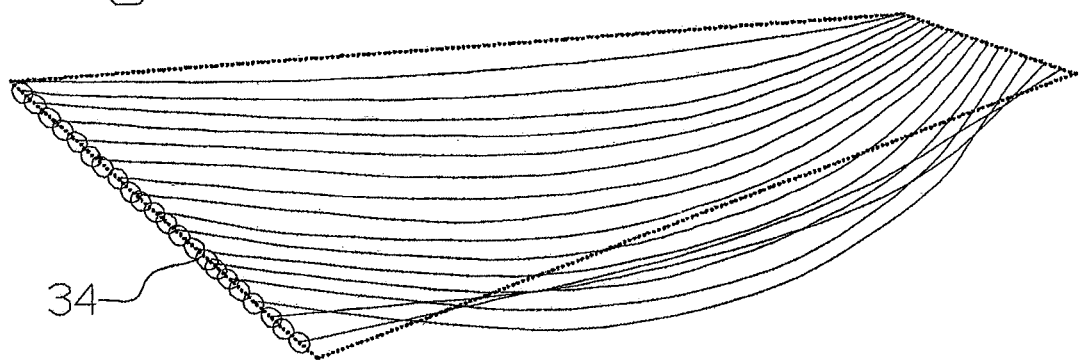

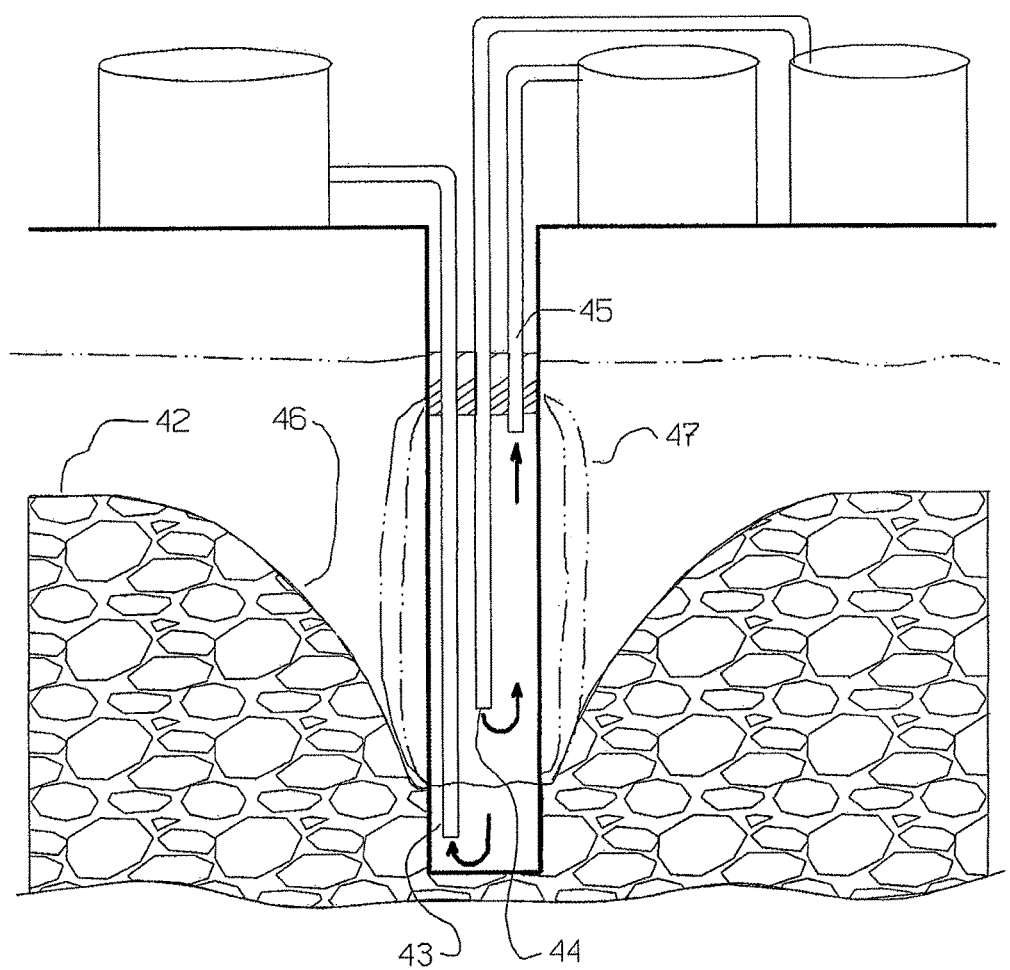

METHOD OF FORMING SUBTERRANEAN BARRIERS WITH MOLTEN WAX

CROSS REFERENCE TO RELATED PATENT APPLICATIONS

This application is a divisional of U.S. Ser. No. 13/784,342 filed on Mar. 4, 2013, which is a divisional of U.S. Ser. No. 12/440,742 filed on Mar. 11, 2009 and is now U.S. Pat. No. 8,387,688 issued on Mar. 5, 2013, which is a § 371 U.S. national stage filing in international application PCT/US2007/020063, filed Sep. 14, 2007, which was published in English on Mar. 20, 2008 as WO 2008/033536, and claims priority to U.S. Provisional Patent Application Ser. No. 60/844,432, which was filed on Sep. 14, 2006, all of which are incorporated herein by reference in their entirety.

FIELD OF THE INVENTION

The present invention relates generally to a system and method for using wax to seal both highly and marginally porous soil and rock materials of subterranean formations to create subterranean hydraulic barriers for the protection of groundwater resources. The barriers may be used to prevent pollution due to coal bed, oil, tar sands, or oil shale recovery operations.

BACKGROUND OF THE INVENTION

In the production of oil shale by an in-situ heating process, multiple boreholes are placed in the ground and heat is applied for a period of years to convert the heavy oil or kerogen into lighter oil that will flow or be mobilized by water or steam to recovery boreholes.

One problem to be addressed is that after recovering the bulk of the oil the residual mobilized hydrocarbon liquids can become free to move in the subsurface and may contaminate groundwater. Barriers of clay and cement have been used to create subsurface barriers to groundwater movement. However, clay and cement cannot permeate most soil or rock. Creating an effective barrier generally requires removal of soil and rock material. This is a tedious task for depths over 100 feet. For oil shale recovery, the barriers may need to be up to a half mile deep. Placing the barriers is more difficult to control as depth increases. The barrier may need to extend through many formation layers of permeable and impermeable strata.

Freeze barrier of ice within the soil formation constructed by means of refrigeration pipes lowered into boreholes have also been used. A barrier may be needed to facilitate removal of groundwater within the perimeter of the barrier to improve heat distribution and prevent the mobilized hydrocarbon fluids and gas from migrating out of the heated zone. However, a freeze barrier may be ineffective in formations that do not contain sufficient water to form a barrier at all locations, are impermeable to water, or contain mostly hydrocarbons. A freeze barrier also may not be maintained in perpetuity to prevent environmental contamination. Even after final sweeping of the produced zone with water there will still be residual hydrocarbons in the lower permeability areas of the strata that can contaminate groundwater if the freeze barrier is removed.

As described in U.S. Pat. No. 5,879,110, historically, jets have been used to impinge upon and disrupt surrounding soil and insert wax and grout in combination with a synthetic liner. U.S. Pat. No. 5,879,110 is incorporated by reference in its entirety. This disruption to the surrounding soil is undesirable for large scale operations.

Thus, an impermeable subterranean barrier that is economical, environmentally sound, and effective is needed. An impermeable subterranean barrier that is formed using a system that does not depend on the disruption of subterranean formations which may have variable properties increases the reliability and potential depth range. A controlled and propagated permeation grouting in which the range of permeation of the grout is controlled by thermal preheating of the formation, rather than dictated by the local formation permeability, ease of disruption, or fracture properties is needed.

SUMMARY

In accordance with one embodiment, the present invention provides a method of permeating and infusing a formation around a borehole with wax by heating a formation surrounding a borehole, pumping molten wax into the formation, and allowing the molten wax to flow into, permeate and fills voids in the formation without disrupting the formation.

In accordance with another embodiment, the present invention provides a method of permeating and infusing a formation around a borehole with wax by heating a formation surrounding a borehole, pumping molten wax into the borehole, heating and circulating the molten wax vertically within the borehole for an extended period, and recovering molten wax from the borehole, suitably by displacing it back to the surface with another material of different density. In preferred embodiments, heating and circulating the molten wax is achieved using a heater and pump attached to a circulation pipe extended to the bottom of a zone of the borehole to be heated.

In accordance with another embodiment, the present invention provides a method of permeating and infusing a formation around a borehole with wax by heating a formation surrounding a borehole, drilling a plurality of closely-spaced boreholes along a subterranean boundary, pumping molten wax into the boreholes, and allowing the molten wax to permeate into a formation surrounding the boreholes thereby forming a hydraulic barrier along said boundary, or heating and circulating the molten wax vertically within the borehole for an extended period, and recovering molten wax from the borehole, suitably by displacing it back to the surface with another material of different density. In preferred embodiments, heating and circulating the molten wax is achieved using a heater and pump attached to a circulation pipe extended to the bottom of a zone of the borehole to be heated.

In accordance with another embodiment, the present invention provides a method of forming subterranean barriers by drilling multiple closely-spaced boreholes along a subterranean boundary; treating the boreholes with infusions of molten wax; and forming a hydraulic barrier along said boundary.

In accordance with another embodiment, the present invention provides a method of forming subterranean barriers by drilling multiple closely-spaced boreholes along a subterranean boundary; treating the boreholes with infusions of molten wax; and forming a hydraulic barrier along said boundary, or cutting a pathway between adjacent boreholes with an abrasive cable saw, circulating molten wax through the pathway to form a hydraulic barrier, and allowing the molten wax to permeate into a formation surrounding the pathway.

BRIEF DESCRIPTION OF THE DRAWINGS

FIG. 2A is a schematic depicting an embodiment of a row of vertical boreholes in a formation containing fractures with the natural water table near the surface. FIG. 2B shows a cross-section plan view of the columns of wax-permeated rock of FIG. 2A.

FIG. 3A is a schematic depicting an embodiment of a vertical barrier constructed from a series of substantially horizontal directionally drilled boreholes. FIG. 3B shows a cross section view of the vertical barrier of FIG. 3A.

FIG. 4A is a schematic depicting an embodiment of a substantially horizontal directionally drilled borehole with a wax permeated cut proceeding upward from it. FIG. 4B shows a cross-section view of FIG. 4A.

FIG. 5 is a schematic depicting an embodiment of a substantially horizontal barrier constructed from a series of substantially horizontal directionally drilled boreholes.

FIG. 7 is a schematic depicting an embodiment of a method of circulating molten wax within a particular vertical interval of open borehole.

Figure 1:
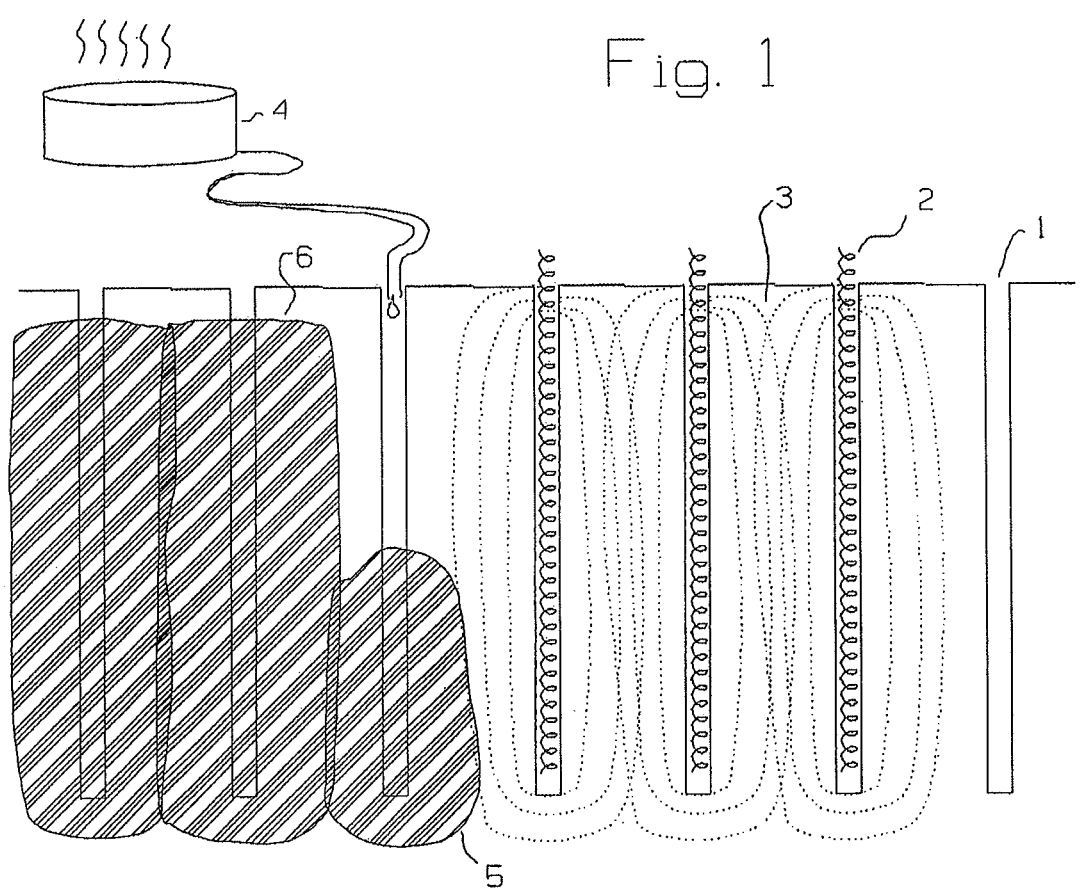
FIG. 1 is a schematic depicting an embodiment of a row of vertical boreholes drilled along a desired pathway of a vertical barrier in an unsaturated rock or soil formation.

While the disclosed methods and apparatus are susceptible to various modifications and alternative forms, specific embodiments thereof have been shown by way of example in the drawings and are herein described in detail. The figures and written description are not intended to limit the scope of the disclosed inventive concepts in any manner. Rather, the figures and written description are provided to illustrate the disclosed inventive concepts to a person skilled in the art by reference to particular embodiments.

DETAILED DESCRIPTION

The present invention utilizes the unique permeation properties of molten paraffin, crude petroleum, and other low viscosity molten waxes to provide an underground, desirably impenetrable barrier for use in the oil field services, oil shale recovery, and nuclear power industries. At temperatures approaching the boiling point of water these waxes have a very low viscosity. These waxes can permeate sand, clay, and most sedimentary rocks. These waxes can permeate sand, clay and most sedimentary rocks with a wicking action. Molten wax permeates clay and low permeability sedimentary rocks by a capillary wicking action that allows the wax to move through heated formations more readily than water does. Molten wax can also penetrate micron size fractures in rock. Molten wax can pass between the microscopic laminations in competent shale rock but its movement stops when it reaches an unheated formation. In a formation heated significantly above the melting point of the wax, the molten wax remains low in viscosity and can flow a great distance. Molten was wax poured into a uniformly heated borehole moves into the heated zone and forms a waterproof matrix within the heated radius, filling porosity of the heated rock zone as a liquid fills a cup. Subterranean barrier walls may be formed by heating a row of holes such that the heated radius of each hole overlaps. By addition of surfactant additives, wicking is enhanced and these molten waxes can better permeate materials with significant moisture content. With the proper conditions, molten wax can be used to form a waterproof barrier in a water-wet formation.

By means of such methods, deep vertical barriers may be formed by wax permeation between adjacent drilled boreholes that are preheated with heating systems or heated by circulation of molten wax or other fluids. Wax barriers do not require the removal of native material in the pathway but instead permeate the formation. Barriers can potentially be formed thousands of feet deep. Another advantage of the present methods is that the excess water in the formation, i.e., formation water, may be extracted from the bottom of the boreholes used to form the barrier and molten wax can flow through solid rock and seal fractures and voids between holes that do not directly connect to the boreholes. Barriers may be formed by wax permeation between at least two adjacent directionally drilled holes. Basin shaped, partially horizontal barriers may thus be formed under contaminated lands by forming barriers between a series of directionally drilled holes. Vertical barriers may also be formed between a pre-heated directionally drilled horizontal borehole and the surface, along a sawed pathway that is heated by a flow of molten wax as it is being cut. Barriers may also be formed between two adjacent substantially vertical boreholes along a sawed pathway that is also heated by a flow of molten wax.

In this specification, "formation" means the strata of the earth, the rock, or the soil of the earth. Holes drilled into a formation are referred to as wells, boreholes, wellbores, or "holes." Forming an impermeable subterranean pathway in a formation generally includes drilling one or more boreholes along the desired pathway, heating at least a portion of the formation through heating means or circulation of hot matter into the borehole, and conveying molten wax into boreholes such that it flows into the pores of a portion of the heated formation.

In the construction of impermeable barriers around a zone of oil shale by previous methods, it is generally assumed that the barrier is a large square and that succeeding adjacent zones will also be contiguous adjoining squares of the same size. Such procedures can also be used in accordance with the present invention. However, in addition to the improvements obtained by making the barriers using molten wax, barriers in accordance with the present invention are desirably formed in a hexagonal pattern across the ground surface. For a square mile size area enclosed by a barrier, using a hexagon shape with six equal sides 3276 feet long compared to four sides 5280 feet long results in a perimeter that is only 93 percent as long as the square area. The area perforated with heating wells to produce the oil must not be too close to the barrier wall or the heat could compromise the wall. The barrier is preferably more than 25 feet away from the nearest heating zone. The hexagonal shape facilitates uniform heating better than square enclosures and less acreage is left un-productive. Round enclosures are fine for mining a single area but are wasteful geometry if many such enclosures are contiguous. Also the heat loss efficiency in the corner areas will be improved, resulting in a significant energy savings.

Formation Preparation

In accordance with the present invention, there are several methods to begin the construction of a subterranean barrier. Most methods begin by drilling a row of vertical boreholes or wells along the perimeter where the wall is to be formed. A tracking instrument or inclination measuring tool may be used to monitor the verticality and/or position of the boreholes to keep them closely grouped and relatively parallel. Such "steering tool" instruments are known in the art of directional drilling. Vertical holes generally offer lowest cost but the holes may also be at an angle. These holes may be an open hole or cased near the surface and cemented to the depth of the top of the barrier or to full depth. In various embodiments, it may be unnecessary for the barrier to extend back to the surface. The holes may be drilled using compressed air for cuttings removal or may be drilled with drilling mud. Then, the mud may be displaced out of the hole with air, water, or molten wax based fluids.

"Cable saw" means an abrasive wire rope, steel cable, diamond wire, chain, roller chain saw, or other abrasive tensile member that can form a cut through a formation. A pulley or sheave is a roller friction-reducing device for wire rope cable and is functionally the same as a sprocket in the case of a roller chain saw in that it allows the cable saw to pass through an angle with greatly reduced friction.

The contact angle or "cable saw-to-formation contact angle" is the degree of arc that the cable saw passes through while it is pressed against the formation. The total friction on a cable cutting through a formation is roughly described by the following relationship. The ratio of the tension on the pulling end of the cable to the drag on the trailing end of the cable will be (T1/T2) $T1/T2 = e^{ka}$ where is the coefficient of friction and a is the angle of contact in radians. At 180 degrees the angle is 3.141 radians and with a coefficient of friction of approximately 1.2, the friction ratio T1/T2 is about 43 to 1 such that most of the cutting power is lost to friction. If the weight of the cable is 1/43 the strength of the cable or the maximum winch pull, the cable will simply be stuck. Note that the formula applies to any shape arc from a gentle curve to a sharp edge. The actual coefficient of friction between the formation and the cable is quite variable so the lower the contact angle the more efficient the cutting process. Contact angles less than 180 degrees are most desirable for practical operations.

Excess ground water may also be removed prior to construction of a wax barrier by placing extraction wells near the boreholes to be used for forming the wax barrier. If the rate of water movement through the formation is limited, it may be possible to pump water from the bottom of the same borehole that is used to form the wax barrier. The well may be fitted with a screen and sand pack. The well may be used as an open hole to extract water from the formation and produce a drawdown cone around the well. This effectively dewaters the formation above where the barrier is to be constructed. The bottom of the well and the drawdown cone potentiometric surface is preferably substantially below the bottom of the desired barrier. Molten wax is lighter than water and will float on a layer of water. With multiple pipes in the borehole, the extraction of water may continue even while heating or wax permeation is in progress. Another method is to simply heat the borehole with the water in place and then pump molten wax into the borehole from the top and allow the wax to displace the water down the well and out into the formation or up a tubing.

It is difficult to make boreholes that are truly straight so a wider spacing tolerance increases the probability that the barrier will have no gaps. Another way to apply the wax barrier method uses directionally drilled holes to form the desired barrier. Directionally drilled holes may be made at different depths to produce a stacked row of heating pipes along the desired vertical pathway. Another technique is to directionally drill angled pathway holes to the same depth and then angle back to the surface, staggering the longitudinal spacing to generate a grid of pipes along the desired pathway.

Directionally drilled holes with substantially uniform spacing may be installed to trace out a barrier in any orientation. Such barriers could form a basin under a contaminated land area that threatens to pollute groundwater. The basin structure could be formed in rock even if the rock contained many small fractures because the wax would seal the fractures. Directionally drilled boreholes can be drilled to trace the shape of a basin under the contaminated area. A short surface casing cemented in place at each end of each hole can direct fluids into the borehole.

Construction of barriers in some other applications requires a higher degree of certainty of the lack of gaps in the barrier. Accordingly, in some formations it may be desirable to mechanically cut a vertical pathway between more widely spaced, adjacent holes to construct a relatively thin barrier along a long straight perimeter path. In this method the formation heating is accomplished by a flow of molten wax circulated through the cut. This allows the molten wax to flow into the formation to create an impermeable formation on each side of the cut. This cutting method may be relatively expensive but it may require much less wax since the barrier can be relatively thin if cut with a diamond wire saw or cable saw. This cutting can be done with a top-down method or a bottom-up cutting action of a cable saw. The method uses a pulley at each end of the path where the cable contacts the formation to minimize the contact angle of the cable with the formation. Formation contact angles less than 180 degrees, and preferably less than 160 degrees, are desirable for preventing generation of excessive friction and sticking of the cutting cable.

FIG. 1 depicts a row of vertical boreholes 1, drilled along the desired pathway of a vertical barrier in an unsaturated rock or soil formation. Heating means such as electric heaters 2, are inserted in the boreholes to heat the formation. The heating is continued until the heated zone 3, overlaps between adjacent boreholes. Molten wax 4, is introduced into the borehole and allowed to permeate into the heated zone 5, around the boreholes. Additional molten wax is introduced into the borehole, slowly filling the porosity of the heated zone from bottom to top 6 or from top to bottom in the case of water saturated areas.

Larger fractures which do intersect with the borehole can require a significant volume of costly wax to seal because the wax flows into them more rapidly and may flow for some distance away from the heated zone before cooling enough to solidify. The rate of flow into the wellbore connected fractures 58 can be reduced in certain embodiments by pre-grouting with cement or clay based grouts and drilling fluids which plug the fractures connected to the borehole. The molten wax will permeate and wick through the cement or clay grout at a relatively slow rate and enter these fractures. Due to the slow rate of flow, the wax will rapidly cool and solidify at the point the fracture leaves the heated radius 59. Pre-grouting plus pre-heating of the boreholes results in minimizing the amount of grout and/or wax required while sealing fractures in the heated zone even if they do not connect with any boreholes.

Thick deposits of oil shale may cover hundreds of continuous square miles so the land is desirably divided into manageable size areas that can share the same perimeter wall minimizing the length of the perimeter wall to be installed for the acreage mined.

The amount of wax required to produce a deep barrier around a large section of land can be enormous. Thus tailoring the barrier to reduce the length of barrier needed is desirable. For example, if vertical holes are drilled on 8 foot centers around the field, then the wax must permeate to a distance of at least 4 feet from the wellbore to bridge the gap between the drilled holes. Since holes generally are not perfectly straight, the actual diameter of the wax infused formation around each borehole may need to be more like 5 or 10 feet. This provides a minimum barrier thickness of 72 inches if the boreholes were exactly 8 feet apart. If the boreholes were actually 9 feet apart, the minimum barrier thickness at the overlap would only be 52 inches. The heating process to heat out to a 5 foot radius is relatively slow and depends on may factors but is expected to take between 3 and 6 months with a borehole temperature of 400° F. and a rock formation temperature of 80° F. The fractures and porosity of deep rock formations vary widely but some oil shale formations also have significant porosity in the form of solution cavity holes. Wax is expensive compared to cement and clay grout materials. The amount of wax required to produce a barrier in fractured and vugular rock formations can be reduced by pre-grouting with other grout materials such as cement, flyash, lime, and mixtures of cement and bentonite. When a formation has been pre-heated, the molten wax has the capacity to slowly permeate through sedimentary rock as well as any cured cement and bentonite grout plugs to access voids and fractures that do not intersect the borehole. The relatively slow rate of permeation into fractures and voids beyond the grout plugs helps assure that the wax does not flow significantly beyond the heated radius.

The entire vertical interval of a borehole may be pre-grouted by pumping cement grout down a tremmy pipe to the bottom of the well and displacing the grout to the top of the well, followed by displacing the excess grout back into the tremmy pipe. The boreholes may be open hole all the way to the surface but are preferably equipped with at least a surface casing to provide for controlled circulation of the well. In some instances, a surface of the borehole may be lined with artificial material. Artificial material includes concrete, clay, or clay tile. In some embodiments, the artificial material may be damaged and the wax permeation may be used as a means of repair.

Temperature Tailoring

The distance the wax will permeate, or pass through micro-fractures, may be increased by pre-heating the formation or using higher temperature molten wax or by pre-heating a larger radius around the borehole, by using higher temperature or longer duration heating. The surface area to volume ratio of the hole and fractures impact how rapidly the hot molten wax will lose its heat to the colder formation. In accordance with various embodiments, the formation will first be heated prior to the introduction of the molten wax. A heat source is applied to the boreholes within the zone where the barrier is to be formed to heat the formation to at least the melting point of the wax. Heat sources may include resistance heaters, steam, hot water; hot oil, hot water, or molten wax in a circulation pipe loop, hot air, microwave, or electric resistance or electric impedance heating. Others have demonstrated that resistance heaters lowered into shallow wells can be successfully used to heat a large block of soil. The same approach should work at great depths, though higher voltage may be required to transfer electric power more efficiently. Hot air blower systems fired by combustion may be used to circulate hot air through a pipe directly to the bottom of the borehole. The hot air then flows along the annulus between the pipe and the open hole to the surface. Waste air may be re-circulated to the heater or used to pre-heat other boreholes.

The heaters may be operated for weeks or months until the soil formation is preferably at least hotter than the melting point of the wax. Optionally heaters may initially be placed in every other wellbore with temperature probes in monitor wells between them to measure the initial temperature profile of the heat from adjacent boreholes to help verify that the entire pathway will be heated to at least some minimum temperature. Thermal imaging tools lowered down the boreholes may be used to detect intervals that are not heating uniformly. Drilling the holes and heating the formation around a large section of land may take many months. It may be schedule efficient to first drill the alternate holes that are to be heated first and begin the heating process in them as they are completed before drilling the monitor holes in between. After verifying that proper heating is occurring in the monitor wells, heating can begin in them as well. After the soil formation around a borehole has been at least partially heated, the heating process may be continued using molten wax. Molten wax is introduced into the boreholes and a flow is maintained and recirculated molten wax is circulated in the borehole while the wax permeates the formation and continues to add more heat and expand the heated radius. After the soil formation has been heated, molten wax is introduced into the boreholes and a flow is maintained and hot wax is circulated in the borehole while the wax permeates the formation. The molten wax is permitted to flow for an extended period of days or months until the wax has saturated the pre-heated zone. The cylindrical pre-heated zone will fill like a cup because the wax cannot flow substantially beyond the pre-heated zone, except where there are fractures and even fractures will self-seal at some greater distance. The optimum hole spacing is an economic decision based on the cost of drilling, the cost of wax, and the cost of heating to various radii around the borehole.

Alternatively, heating the borehole and surrounding formation is performed by placing an electrical heating device into the borehole, placing a heat transfer fluid into the borehole, introducing heated matter directly into the borehole, introducing materials into the borehole to facilitate a chemical reaction that releases heat, or heating the drilling fluids used to drill the borehole.

Hot air can be circulated through the holes to pre-heat the formation. Other heating means such as electric heaters, heat transfer pipes, circulating steam or heated fluids, or introducing chemical reactants that release heat may also be used to heat the formation through and along the boreholes. Circulating molten wax in the hole carries additional heat into the formation and increases penetration. Greater penetration of the wax allows wider spacing of boreholes. Preheating the formation surrounding the boreholes before introducing the molten wax allows deeper penetration into the formation. The wax will permeate through and saturate at least the portions of the formation that are heated to the melting point of the wax. A deep subsurface barrier may be created by heating the earth through multiple boreholes spaced at intervals such that the soil is heated to preferably at least above the melting point of the wax along the desired pathway. Heated matter, such as water, air, or natural gas may be introduced into the boreholes to provide heat to the formation between adjacent boreholes. Then molten wax is introduced into the boreholes allowing the wax to permeate into the heated area and cool.

Then, molten wax is introduced to the borehole, and desirably circulated through the holes for an extended period, to allow formation of the barrier. In embodiments where the molten wax is recirculated, the molten wax is preferably re-heated and solids removed before recirculation. The barrier is formed by molten wax permeation outward from each hole to a radius sufficient to overlap or connect to the flow from the adjacent hole.

Having access to each end of the borehole limits the need for a circulation pipe in the hole, but it may still be used to help achieve more uniform temperature along the borehole or if there is no surface access to one or more sides of the contaminated site. In radioactively contaminated sites it may be preferable to perform substantially all heating before introducing the molten wax to prevent potentially contaminated wax circulating back to the surface.

Generally the native formation temperature is less than the melting point of the wax for it to make a permanent barrier. The basic wax barrier method described above may be improved by lowering a pipe to the bottom of the borehole and circulating molten wax between the pipe and the hole. The wax is circulated back to the surface and continually reheated and the formation solids removed. Molten wax circulation may be maintained for months to heat the formation around the borehole. The radius of wax saturation will continue to increase as the molten wax circulation continues, until a limiting distance is approached, due to self-insulation or thermal losses. Larger boreholes, higher molten wax temperatures, lower melt points, and higher rates of circulation all tend to extend this distance. The solidified wax at the thermal interface will tend to insulate the system. Accordingly, once heating has been started it is preferably continued until the desired permeation is complete. The wax can be pumped down the annulus and allowed to flow up the pipe, but it is preferred to pump the molten wax down the pipe and allow it to circulate back up the annulus because this provides the most even heating. If the borehole is relatively small the wax may cool before initial circulation is established. It may be desirable and preferable to preheat the borehole, and thereby the formation, by a flow of hot air, hot water, or hot oil before beginning circulation of the molten wax. Faster circulation may also provide more even heating. The circulation pipe may be comprised of oil well tubing, casing or coil tubing. If only a portion of the borehole, such as an interval beginning at 1000 feet depth and extending to 1500 feet depth, requires a barrier, then an annular bridging device similar to a retrievable bridge plug may be installed on the pipe at the 1000 foot depth and a second pipe, which also passes through the bridge plug, would be used to circulate the molten wax from the annulus back to the surface without filling the annulus above the bridge plug. The distance of wax permeation into the formation may be inferred from the total volume of wax accepted by each borehole over time and core data indicating the porosity of each layer of strata. Additional boreholes may be drilled and cored between the initial holes to evaluate and augment the barrier forming process.

If the strata varies greatly in permeability or fractures through the depth of the desired barrier, some vertical segments of the barrier may be created independently. The circulation heating method described above may be modified by drilling the hole to a limited depth and circulating wax to form the barrier at that depth. After that segment is formed, the borehole may be drilled to a greater depth and the process repeated. Hydraulic fracturing may be selected to connect adjacent boreholes. Hydraulic fracturing uses or occurs when water or specially engineered fluids are pumped at high pressure and rate into a region to be treated. Fractures occur along the lines of least principal stress, which are typically vertical except very near the surface. By fracturing many adjacent closely spaced holes at once it should be possible to create fractures following the line of holes. Perforating gun techniques may be used to created holes oriented along this line before fracturing operation. Proppant, such as grains of sand, maybe mixed with the fluid to prevent closing of the fracture. Hydraulic fracturing provides improved fluid transport within a large area of formation.

For a complex strata containing many impermeable strata zones, multiple pipes, and pipes extending only to desired strata may be used to produce extra heating in problem areas. Oil well cementing tools using sliding valve mechanisms such as the Halliburton full-opening (FO) multiple-stage cementer may be used in conjunction with packer tools to selectively treat one or more vertical subterranean intervals without treating the rest of the borehole. Electric heating methods may also be used to preferentially produce more heat in one strata than another. A strata containing more water may require much more heat input to reach the desired temperature/radius profile around the borehole.

If groundwater present in some strata interfere with construction of the wax barrier, a freeze barrier may be constructed to dewater the working area before construction of the wax barrier. A freeze barrier is well known in prior art and can be constructed by drilling closely and uniformly spaced holes along the desired perimeter pathway and then placing a chilling means in the holes to remove heat over a period of months. After a freeze barrier is constructed around the perimeter of an area, additional wells in the interior may be used to extract the formation water. After the water is removed, a second row of holes is prepared inboard of the freeze barrier and a wax barrier may be formed in non-saturated conditions.

Wax Delivery

Boreholes drilled into the earth along the desired path of a barrier can be filled with molten wax to seal existing fractures. The distance the wax penetrates away from the borehole will be limited by loss of heat to the formation. Applying greater pressure to the wax will create or open the existing fractures and allow deeper penetration, but the direction of travel will be uncontrolled. The wax will travel only until it cools to a solid state, The most basic method of forming a wax barrier is to simply pump hot molten wax into the boreholes. This can be effective in filling small fractures and cavities out a few feet from the borehole. This is particularly useful if the formation is substantially impermeable but contains many fractures that cross the plane of the barrier, It is most effective if the fractures are horizontal rather than vertical so that the chance of the borehole connecting with the fracture is maximized.

While vertical holes are preferred for making ultra deep vertical barriers, it should also be possible to construct a vertical barrier using horizontal directionally drilled holes. One method is to simply create a stack of roughly parallel and closely spaced boreholes along the desired path of the barrier. These boreholes are heated and then molten wax is circulated through the holes until the permeated zones overlap to form a continuous barrier. The bottom-up method works by first preparing a directionally drilled hole along the base of the desired pathway. A wire rope cable is drawn into the underground pathway along with the pipe. This cable passes around a pulley sheave at each end of the hole such that its total contact angle with the soil is minimized. Friction increases dramatically with the angle of contact and can result in the cable becoming stuck, Thus, the pulley positions are designed to reduce the degree of contact between the earth and the cutting cable. A flow of molten wax is initiated through the annulus of the hole with the wax being re-heated, filtered, and recycled through the hole. A pump at the receiving end of the hole collects the wax to be recycled.

A steel cable is tensioned and circulated through the hole in the direction of the wax flow to generate friction, create a pumping action, and cut a pathway upward through the soil. A traction drive mechanism pulls an endless loop of cable preferably in the same direction continually, but the method could also be applied by reciprocating the cable back and forth. The pulley sheave positioned at each end of the hole may be fixed but may optionally be designed to gradually move toward each other to produce a more uniform cutting force as the cable approaches the surface. The wire rope cable is preferably a non-rotating design that has large external wires that resist abrasion and act as a pumping means.

A portion of the flow of molten wax will follow the rapidly circulating cable moving preferentially through the upper portion of the cut where the cable is working. The molten wax transfers heat to the formation along the pathway being cut. The wax quickly cools and solidifies in the areas of the cut no longer in contact with the hot circulating wax. The molten wax permeates the formation along in the circulated areas creating an impermeable layer perhaps a foot into the soil on either side of the cut. Higher wax temperatures may be used to obtain deeper permeation but temperatures below the boiling point of water are preferred to avoid boiling due to formation water that becomes mixed with the wax.

The bottom-up cut may be brought to the surface or stopped at a desired depth. If the cable should break, the pipe in the bottom of the hole may be heated to liquefy the surrounding wax and then used to pull a new pipe and cutting cable into the hole or a new cutting cable may be inserted or pumped into the hole, provided it has been kept molten by continued circulation. The cutting process then begins again from the bottom. The pipe in the directionally drilled hole may be withdrawn in the same way after construction. Additional sides of the full perimeter barrier can intersect the previous barrier partially melting it and creating a seamless wall.

Another top-down method of mechanically cutting a pathway may be applied to two or more adjacent substantially vertical boreholes. This method is thought to have more utility in hard rock formations. A number of vertical holes are first created along the desired pathway. Two adjacent holes are heated as described above and filled with molten wax. However in areas where the formation is unconsolidated, such as near the surface, the holes may not be heated. This will minimize caving of the hole. Optionally, a small pipe may be placed to the bottom of the drilled holes to circulate molten wax up the hole to maintain an open hole.

A pipe with a pulley sheave on its end is positioned over each of two adjacent holes and a wire rope cutting cable or diamond wire cable is threaded through the pulley sheaves. The pipes are lowered slightly into the holes and the cable tensioned so that it bears on the ground between the two holes on the surface. The ends of the pipes have multiple rollers that bear against the walls of the hole and minimize friction with the walls of the hole. A motive device, preferably a continuous cable traction drive, but alternately a pair of winches each alternately pulling or paying out cable under tension, circulates the cable around the pulleys creating an abrasive sawing action along a line between the two holes. Molten wax is pumped into a pipe in the first hole exiting from near the depth of the pulley such that the cable circulation carries it toward the second hole. The first hole and its tubing has a sealing means at the surface so that it can be pressurized. Cuttings are conveyed by the pumping action of the cable to the second hole. Optionally, a pipe extending to near the pulley of the second hole discharges molten wax at a lower pressure than the first pipe, such that circulation is established that carries these cuttings back to the surface. The efficient circulation of cuttings may be enhanced by bubbles from an air jet, as is known in oil well drilling prior art. Heated air or other gas is injected below the point where the cable is discharging cuttings into the second hole. The bubbles reduce the fluid density and help circulate the cuttings to the surface in the second hole. The wax returning to the surface is continually cleaned of cuttings by cyclonic devices and filters and it is reheated and recycled to the first hole. The pipes are allowed to descend into the holes as the cable cuts a pathway between the adjacent holes. The downward force on the pipes is continually adjusted in accordance with the cable tension to minimize the total contact angle where the cable contacts the formation. This minimizes total friction so that the cable does not get stuck. The heating action of the flow of molten wax heats the face of the cut and the molten wax permeates and wicks by capillary action into each side of the cut to form the barrier without any need to disrupt or fracture the formation. Higher wax temperatures may be used to obtain deeper permeation.

The top down method may be applied with some modification to forming a barrier between two directionally drilled holes. Pushing pipes with end pulleys down into directionally drilled boreholes could be done, but it is preferred to install the cable saw from the exit end of the two holes and pull pipes with pulleys on the ends to control the cable saw-to-formation contact angle to less than 180 degrees and preferably less than 160 degrees of arc. The cable may extend away from the formation contact area through the pipes back to the surface. The interior of the pipes may be coated with an anti-friction coating as well as lubrication from the flow of molten wax.

A thinner permeation barrier may be formed in the top-down method by mechanically cutting a pathway between two adjacent boreholes with a cable saw and will comprise at least the steps of;
1. Drilling at least two adjacent boreholes.
2. Placing an abrasive cable saw against the formation between the two boreholes.
3. Continually positioning a pulley in each borehole to provide a cable saw-to-formation contact angle of less than 180 degrees.
4. Circulating or reciprocating the cable saw to cut a pathway through the formation.
5. Continuously circulating molten wax through the cut pathway as the cut advances.

A thinner penueation barrier can also be formed by the bottom-up method from a single directionally drilled hole and the surface or a shallow trench by mechanically cutting a pathway between the hole and the surface or trench comprising at least the steps of:

1. Directionally drilling a hole from the surface to depth and then back to the surface.
2. Pulling at least one cable saw member or at least one cable saw member and one pipe into the hole as the drill pipe is withdrawn.
3. Fixing a pulley for the cable saw tangent with the hole at each end such that a formation-to-cable contact angle of less than 180 degrees is maintained.
4. Tensioning the cable saw around the tangent pulleys while the cable is circulated or reciprocated through the cut.
5. Circulating molten wax through the hole in the direction of cable saw travel such that at least a portion of the flow passes through the pathway formed by the cut.

Both the bottom-up method and the top-down method may be modified to place barriers made of other grouting materials such as mixtures of hydrated bentonite and cement. The thickness of the barriers formed will be limited to the thickness of the mechanical cut because these materials do not permeate significantly into most formations. Drying of the barrier materials or earth movement could cause failure. Molten tar, bitumen, or asphalt cement may also be a useful grout for this application. It is not considered a wax by the present, definition and will offer little permeation but it may remain flexible and will not be damaged by drying.

FIG. 2 depicts a similar row of vertical boreholes in a formation containing fractures 7, with the natural water table 8, nearer the surface. A drill pipe or steel tubing 9, is inserted in the borehole and hot water or other fluid is circulated in the well to pre-heat the formation and fractures 10, out to some distance beyond the borehole 11. This can be performed as an independent step after drilling the boreholes. The circulation of hot fluid may also be done as the well is drilled by heating the drilling fluids with a heater 12, tied into the drilling mud circulation pump 13. In fractured formations, hot water may be intentionally pumped into the fractures 14, to preferentially heat the fractures out beyond the radius 15, of the heated zone around the borehole 16. Molten wax 17, is pumped into the annulus of the borehole and displaces the water 18, or drilling mud downward causing the water or drilling mud to flow back up the tubing 19, to the surface. The pressurized column of molten wax 20, floats on top of the water column and forces the water downward. The pressurized column of molten wax displaces the water radially outward 21 into the formation through existing fractures and the porosity of the rock. After the water or drilling mud has been circulated out of the borehole, circulation is reversed and molten wax 22 is passed through a heater 23 and circulated down the tubing and up the annulus under pressure to continue adding heat to the formation as the wax permeates even further 24 into the formation. As the heating and permeation continue, the columns of wax-permeated rock grow together 25 and overlap as shown in cross section plan view 26. After the interconnected columns form a complete barrier, the remaining molten wax in the borehole is displaced out of the well by circulating water down the tubing to force the molten wax up the annulus to be recovered at the surface. This leaves the borehole filled with water. Alternately, the molten wax or water may be displaced up the tubing by injecting air into the annulus, leaving the original borehole clear and dry 27 so that it may be used to detect leaks in the barrier.

FIG. 3 depicts a vertical barrier constructed from a series of substantially horizontal directionally drilled boreholes that are stacked one above the other 28. After the horizontal holes are drilled, the boreholes are heated by a flow of hot material or by electrical means. Molten wax is then circulated under pressure through the holes to permeate the rock around each borehole to form a continuous vertical barrier shown here in cross section view 29.

FIG. 4 depicts a substantially horizontal directionally drilled borehole. An abrasive cable 30 moves through the borehole 31, under tension and cuts a pathway upward toward the surface. The abrasive cable is driven by a traction drive or by movable winches 32. One or both of the winches may be moved to maintain an optimal cable-to-soil contact angle. A flow of molten wax passing through the hole carries cuttings and permeates into the formation 33 on each side of the cut formed by the abrasive cable.

FIG. 5 is a horizontal application of the concept of FIG. 3. FIG. 4 depicts an impermeable subterranean basin structure formed in a formation such as rock by wax permeation from multiple closely spaced directionally drilled holes 34. The holes are first pre-heated by circulating hot fluid through them. Molten wax is then circulated through each of the directionally drilled holes for an extended period. The molten wax permeates the rock around the holes to form overlapping zones of wax-permeated soil.

Figure 6A:
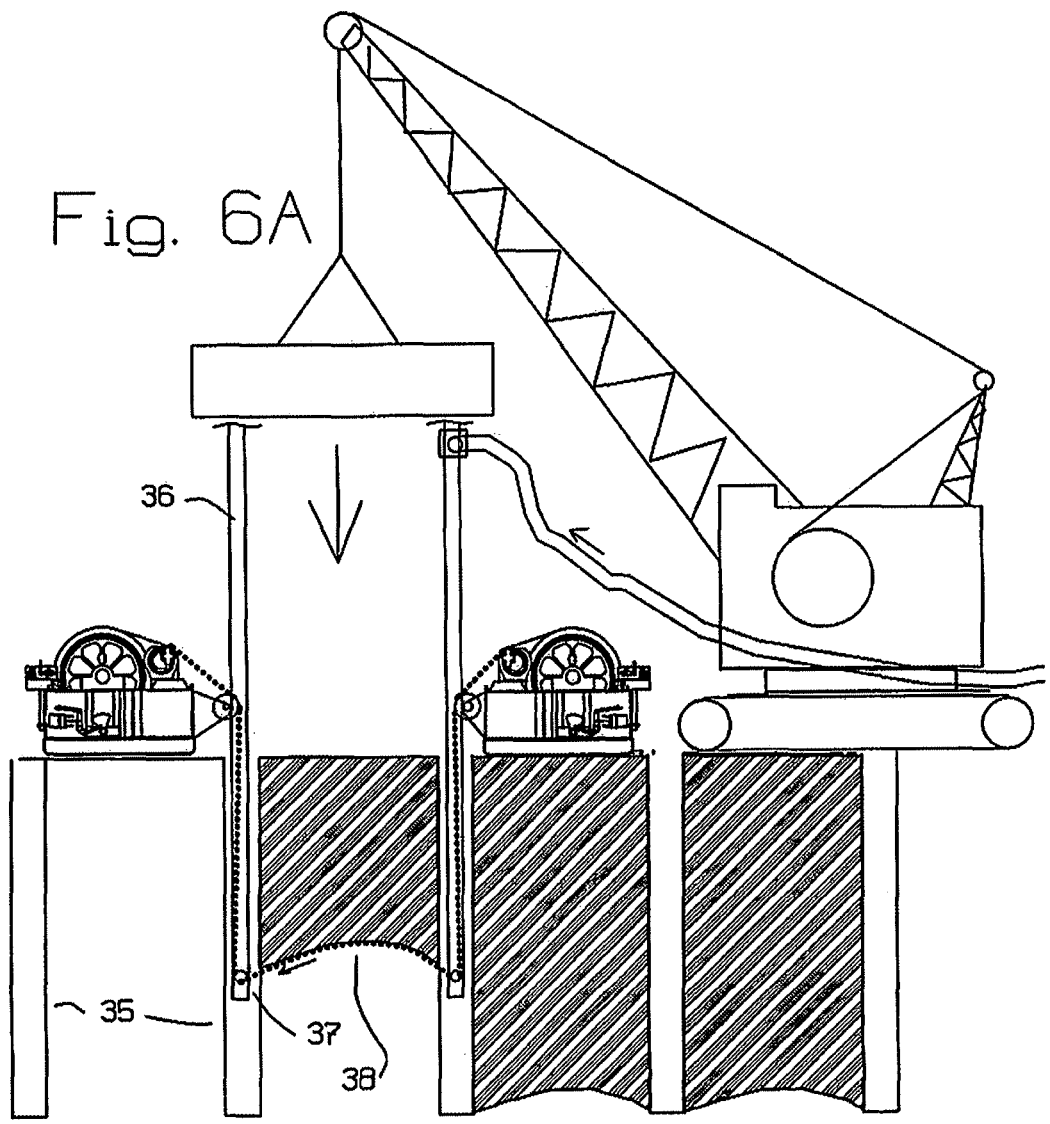
FIG. 6A is a schematic depicting an embodiment of a variation of FIG. 4 wherein the wax permeated cut proceeds downward between adjacent vertical holes.
Figure 6B:
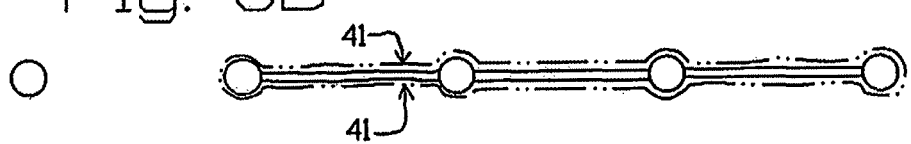
FIG. 6B shows a cross-section plan view of the vertical barrier of FIG. 6A.

FIG. 6 is a top-down variation on the concept of FIG. 4. FIG. 6 depicts a method of cutting a pathway downward between two substantially vertical holes 35. A pair of heavy pipes 36, supported by a suitable drilling rig or crane are lowered into two adjacent holes. The tip of each pipe is equipped with a sprocket or pulley sheave 37 that guides an abrasive cable 38, such as a wire rope, chain or diamond wire saw, and causes it to bear against the rock between said holes. Winches 39, or a traction drive system causes the abrasive cable to cut a pathway 40, through the formation rock. A flow of molten wax is injected through at least one of the pipes such that molten wax flows through the cut to flush cuttings and transfer heat and permeate molten wax several inches into each side of the cut to increase the effective thickness of the barrier as shown here in cross section plan view 41. After one vertical panel is complete, the cutting apparatus is moved to the next section to form a continuous wall. Since the heavy pipe simply holds the pulley sheave and does not have to rotate, the winch system could also be built into a customized drilling rig wherein the abrasive cable runs inside the pipe.

FIG. 7 depicts a method of drawing down the water table 42, in a porous formation to facilitate circulation of molten wax within a particular vertical interval of open borehole to heat the formation and permeate it with molten wax. Water is extracted from the bottom of a well through a tubing 43, while molten wax is injected through another tubing 44, while being extracted from a point above this by a third tubing 45. Pressure maintained in the borehole by the wax injection tubing helps depress the water level to the bottom of the borehole while the pumping of the water creates a cone of depression 46, to dewater the formation surrounding the borehole. The dewatered formation heats more easily and the molten wax permeates the heated zone 47.

Figure 8:
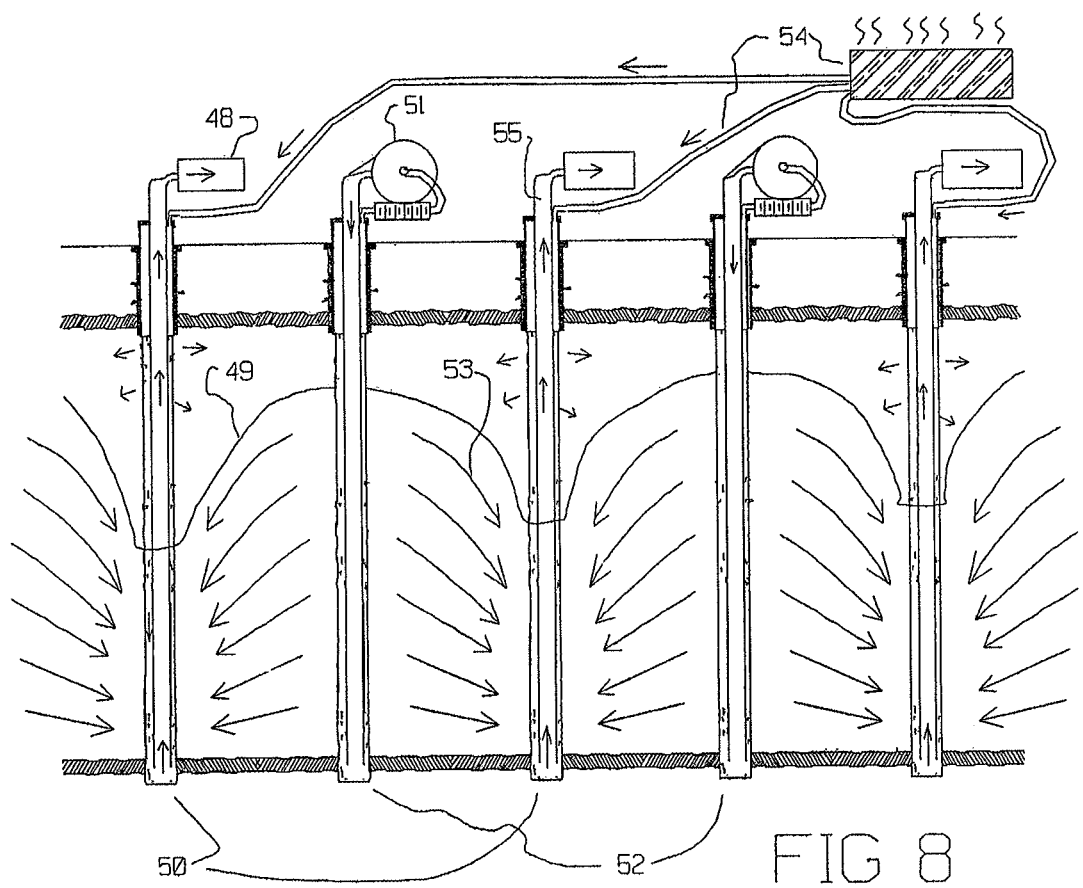
FIG. 8 is a schematic depicting an embodiment of a series of boreholes wherein water is being pumped from the bottom of every other borehole.

FIG. 8 illustrates a series of boreholes wherein water is being pumped from the bottom of every other borehole by a pumping means 48 creating a cone of depression 49 of the water table around those odd numbered wells 50. At the same time, a flow of heated matter such as hot water 51 is circulated under pressure in the even numbered wells between 52. A portion of the hot water that escapes through the fractures 53 from the even numbered wells tends to follow the general pressure gradient flow to the odd numbered wells. This creates a thermal flow from even numbered wells to odd numbered wells that carries heat to the even numbered wells faster than it would without the removal of water from the odd numbered wells. The temperature increase in the recovered water from the even numbered wells indicates the extent of the heating of the rock between the wells. Steam or molten wax 54 may also be injected in the annulus of the odd numbered wells to help heat the areas above the depressed water table. When the temperature of the recovered water 55 approaches the melting point of the wax, water circulation may be discontinued and molten wax may be pumped down the annulus into the even numbered wells. The molten wax will displace the water downward in the wells and also follow the pathways that the water has been using to reach the even numbered wells. Molten wax circulation will then begin first in the even wells and finally in the odd wells.

FIG. 8 also illustrates an alternate hole heating process in which only every other hole, (the even numbered holes in a row of boreholes), is heated by electrical, heaters, heat transfer piping loops, or by direct circulation of hot water, steam, or molten wax through a tubing. As the even numbered holes are heated, temperature probes are placed in the odd numbered wellbores to measure the temperature by depth. The temperature probe is preferably a thermal imaging device that can measure the temperature variation radially around the borehole continuously as it is raised or lowered in the borehole. This allows it to see if the temperature on one side of the borehole is lower than on the other side for the borehole. Such differences could be due to hole spacing, water content or variable formation materials. When the temperature of the odd numbered, wellbores are at least equal or approach the melting point of the wax through the entire vertical interval, then it can be inferred that the temperature of the formation between the wellbores has been heated to at least this temperature. This helps assure that the molten wax will be able to form a continuous path between adjacent wells. The actual formation temperature at any point will increase nearer to the even numbered wells. Temperature measurements or a thermal image of the borehole may indicate that the heating is following established patterns and provide sufficient evidence of uniform heating even before the odd numbered holes approach the wax melting temperature. The infusion of molten wax and continued heating by circulation of molten wax into the even numbered wells may preferably begin before the initial heating means causes the odd numbered wells to reach or approach the wax melting temperature. The even numbered boreholes are called "primary" wells because they could be drilled and heating begun before the secondary wells are drilled. The odd numbered or "secondary" boreholes would be the ones drilled directly between the primary numbered or "secondary" boreholes would be the ones drill directly between the primary boreholes and would not be heated until after the temperature measurement profile indicated that heating progress from both adjacent primary boreholes was nominal. Once the wax from the even numbered wells reaches the odd numbered, secondary wells, hot wax recirculation would be started in the odd numbered wells too.

There are several variations on this approach but they all rely on using heating means in the even numbered holes and monitoring the temperature response in the odd numbered holes to know when enough heating has been done. Since the actual spacing between wells, thermal conductivity, and thermal mass, at various depths may vary, this method monitors actual heating to verify that the formation is heated sufficiently for the wax to permeate.

Monitoring the temperature of the adjacent boreholes over time provides an indication of the identity of the thermal properties of the material in the boreholes. It also indicates how the wax will flow and will serve as an indication of the thickness of the formed barrier or will predict the heating parameters required to permeate the space between boreholes completely.

Figure 9:
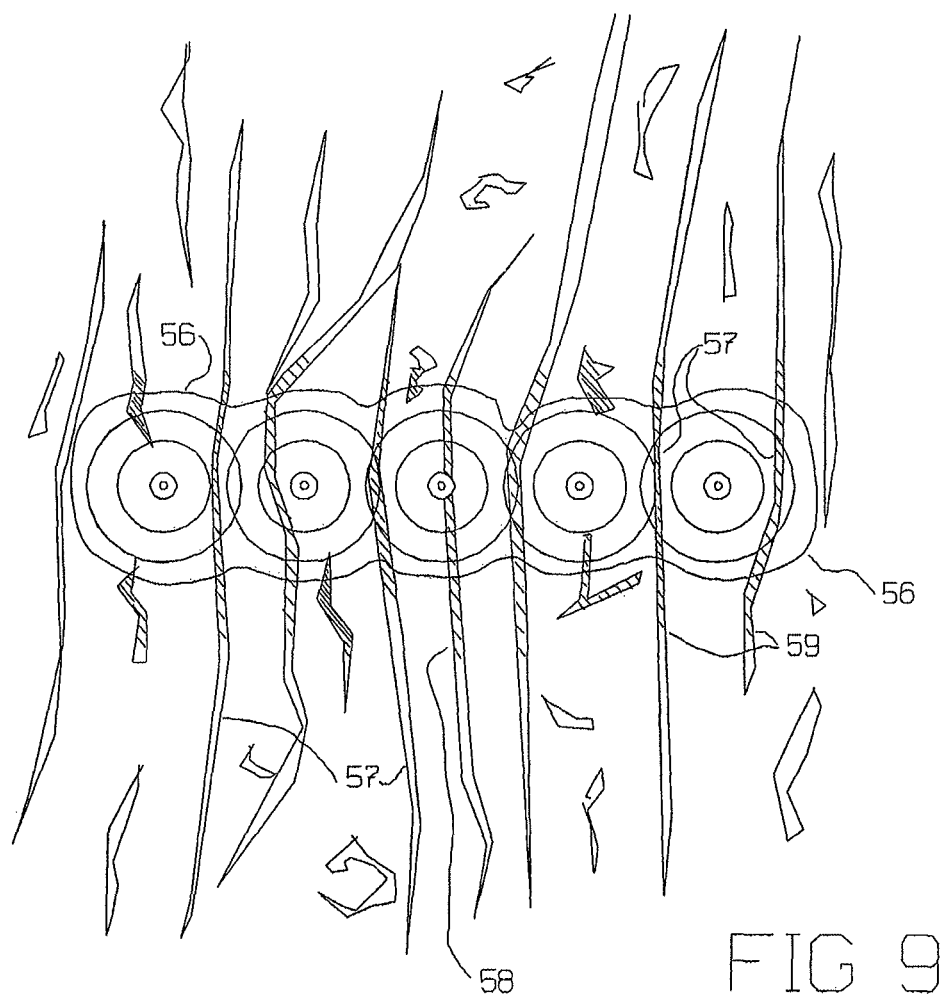
FIG. 9 is a schematic depicting an embodiment of a series of boreholes wherein the molten wax permeates radially outward through a heated zone which overlaps between the boreholes.

FIG. 9 depicts the molten wax permeating radially outward through the heated zone 56 which overlaps between the wellbores. Vertical fractures such as this passing between the wellbores would be impossible to seal with conventional grouts. However, the molten wax permeates and wicks through microscopic porosity that even water cannot readily penetrate. As the molten wax spreads from the wellbores through the heated formation rock it reaches the fractures 57 between holes that do not communicate with the wellbores. Within the heated zone, the molten wax will continue to seep into the fractures and begin to displace the water further outward into the formation. The flow of molten wax into these fractures is limited by the rate of permeation. Thus, the wax will cool and seal these fractures just outside the heated radius.

The desired pressure for adding the wax to the system is low. That is, the wax is delivered to the formation is equal to or less than the fracture gradient pressure of the formation. The fracture gradient pressure of the formation is the pressure that is needed for disrupting the formation such as dislodging, breaking, or cutting material.

Figure 10:
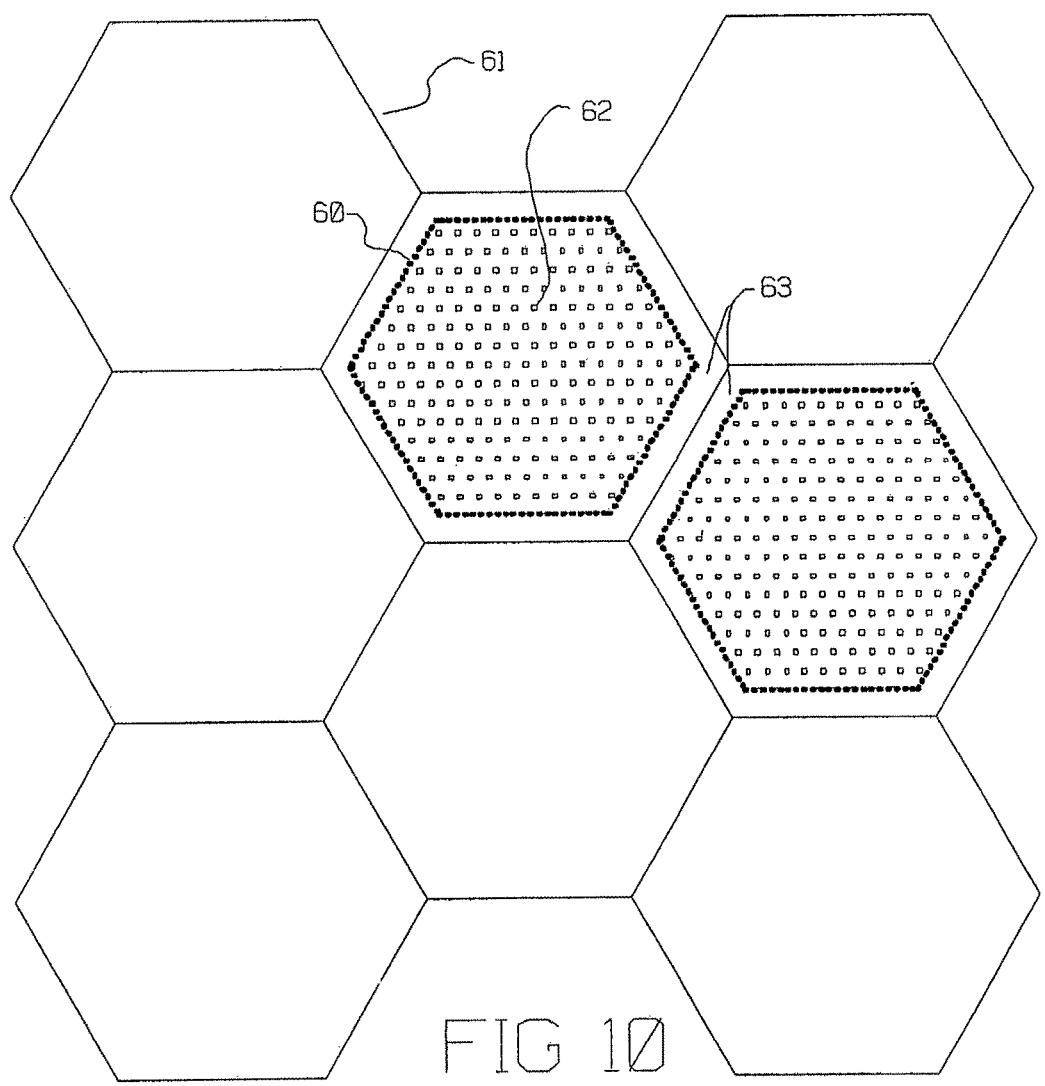
FIG. 10 is a schematic depicting an embodiment of multiple subterranean perimeter barrier walls, laid out in hexagonal patterns.

As shown in FIG. 10, the subterranean perimeter barrier wall 60 is preferably made in hexagonal patterns 61 to minimize the length of wall for the area enclosed. This technique is applicable to barriers made using the freeze walls or other grouting techniques, but is more important for wax barriers because the wax material is much more costly per unit volume than other grout materials. The wax barrier walls remain after the recovery of the oil shale is complete and the hexagonal pattern of the barrier is more resistant to seismic damage than a barrier made in square sections. Since the vertical confining layer of the heated zones may be compromised it is important that the barriers be very durable over time to prevent zones of differing pressure or ground water quality from mixing.

Figure 11:
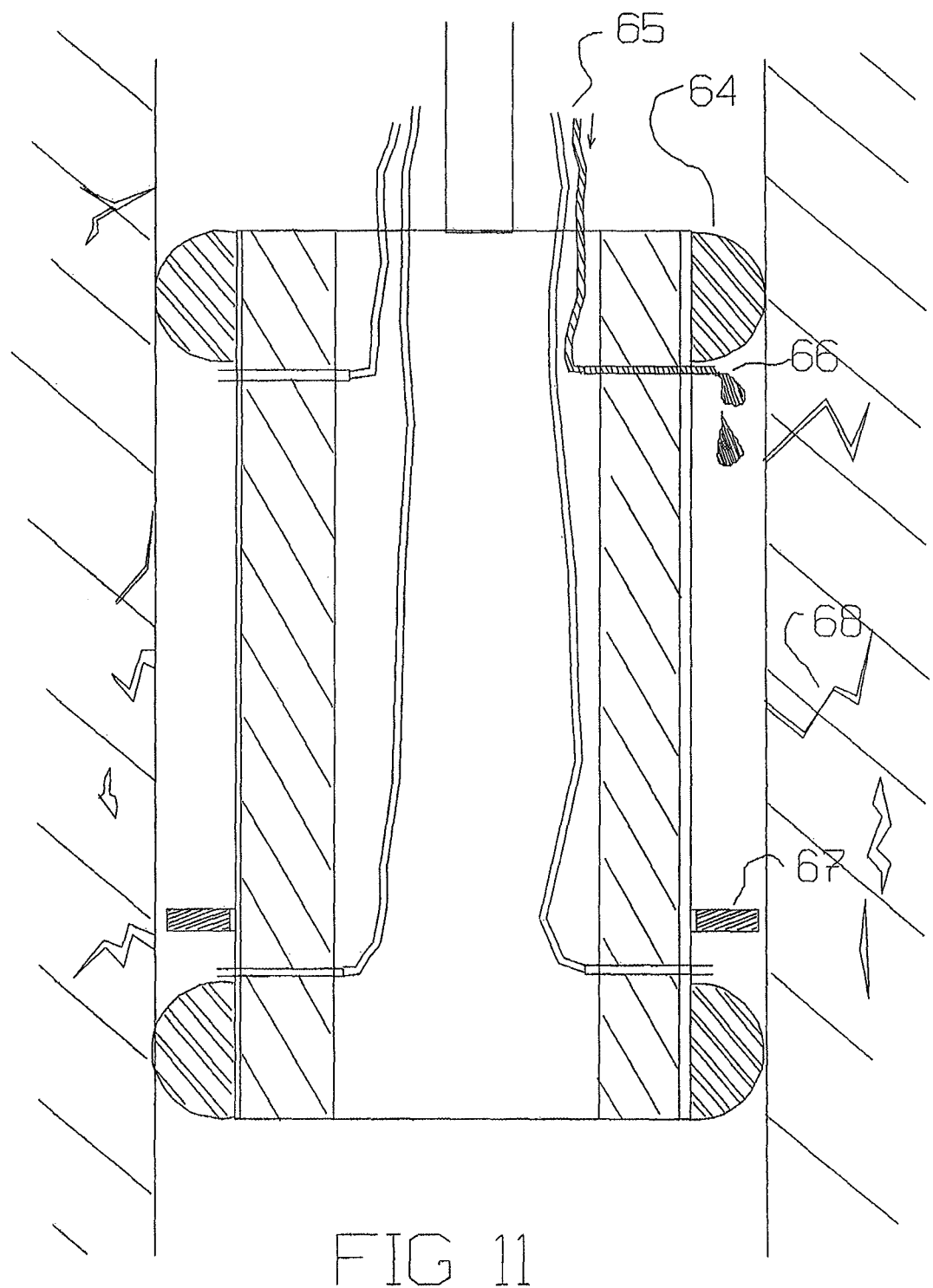
FIG. 11 is a schematic depicting an embodiment of a method of applying heated matter or molten wax to only a portion of a borehole or damaged concrete pipe.

FIG. 11 depicts a method of applying heated matter or molten wax to only a portion of a borehole or damaged concrete pipe. Sealing means 64, located at each end of a pipe isolate an annular section of the borehole outside the diameter of the pipe. Flow lines 65 connected to the isolated annular space allow heated matter such as water or molten wax to be pumped into the space to bear against the borehole. Multiple ports 66, and a floating piston 67, could be added to facilitate displacement of one fluid with another or with compressed air to empty the space. Molten wax flows into cracks and fractures 68 in the heated borehole.

After pre-grouting with such cement or clay based materials, the wellbore would be heated with electrical resistance heating elements, or by hot water injected through a tubing, string to the bottom of the wellbore and circulated back to the surface or to a second tubing string at a highest point in the wellbore where wax infusion is desired. The molten wax is then pumped down the borehole from the annulus at the top of the well, while water is displaced up a tubing string, or smaller pipe. The wax which is lighter than water will remain as a separate phase above the water but will preferably be injected with enough pressure to effectively displace the water downward in the borehole, or out into the formation. While formation water is free to move out into the formation, as the wax moves outward into the formation it cools and solidifies so its movement is thermally limited. Wax barriers may also be formed in saturated conditions by pumping molten wax down the annulus of the boreholes and displacing the water out into the formation or back to the surface through a tubing pipe extending to the bottom of the wellbore.

After the wellbore is full of molten wax, additional molten wax may be circulated in the well for an extended period to provide additional heating as the wax permeates into the heated portion of the formation. This may be done by pumping hot wax down a tubing to the bottom of the well and allowing it to circulate back to the top of the well where it is reclaimed, re-heated and re-injected. As the molten wax circulates in the well, additional heat is transferred into the formation causing the molten wax zone to continue expanding radially outward. At the perimeter of the heated zone, the wax will revert to its solid form which is a thermal insulator. This thermal insulation effect allows the heated zone to expand to a greater diameter than would be possible with electric heating of the same net energy input. The pressure used to circulate the molten wax is preferably lower than the pressure needed to initiate new fractures in the formation being treated. One exception to this is to deliberately attempt to create vertical fractures that will tend to join the closely spaced boreholes. In this method an explosive perforating means such as is known in the art of oil well technology may be used to create perforations oriented along the line of the closely spaced boreholes. The well may then be exposed to hydro-fracturing pressure, as is also well known in the art, to open vertical fractures which will aim in the general direction of the adjacent well. If several wells are hydrofractured at once it may be possible to open a continuous vertical fracture across many wells and inject a sand proppant into the crack using a water gel designed to break after a few hours.

This method could be applied to sealing large boreholes, tunnels, concrete sewer lines or drilled shafts. At larger borehole diameters, the molten wax carries more heat for the surface area of the borehole so the molten wax will penetrate further without pre-heating of the formation. This may be of particular use in sealing large drilled shafts intended for long-term storage of nuclear wastes. The preferred wax would be one that remains sticky and malleable at the underground temperatures and can adapt to ground movement and seismic stress. The molten wax would preferably permeate the first few meters of earth surrounding the drilled shaft converting it into a waterproof and crack resistant material. In very large boreholes such as subway tunnels and shafts for storage of nuclear waste, the volume of molten wax required to flood the entire borehole may be excessive. A treatment pig or other movable apparatus may be placed in the borehole to facilitate treating a section of the borehole with smaller volumes of wax. The pig would comprise a pipe with means for sealing against the borehole on either side of the interval to be treated. The end seals may be mechanical, pneumatic or fluid filled. The pig apparatus may allow for direct heating or circulation of heated matter within the interval to preheat the formation wall. Molten wax may then be pumped into the interval to permeate and seal the borehole. Excess molten wax may then be pumped or displaced out of the interval while the apparatus is moved to the next position in the borehole. The apparatus may be pumped to a position or lowered vertically on drill tubing or wireline. In large horizontal shafts and tunnels the apparatus may be supported on wheels or tracks and moved mechanically when the seals are retracted.

A cracked concrete water or sewer line is essentially similar to fractured rock in a wellbore and may be repaired in a similar manner as a large tunnel. The line would first be heated by directing hot water or hot air through the line to heat it to at least the melting point of the wax. The molten wax would then be circulated through the line under enough pressure to overcome any external water pressure. The molten wax would pass through any cracks into the cold soil and solidify into a waterproof solid patch. The wax would also preferentially flow around the exterior of the heated pipe and produce a covering around the pipe. If only a limited area of the pipe requires repair, the apparatus described above could be positioned in that area to heat the section of pipe and apply the molten wax.

The present invention has many environmental applications in addition to facilitating recovery of oil from oil shale. These include coal bed, oil, tar sands, or oil shale recovery operations. In the oil shale application, the invention places a barrier made from wax around the perimeter of the heated oil shale area. The barrier may preferably be formed far enough from the area being heated that it is not significantly affected by the oil shale heating process. However, if needed, chilling means, such as pipe loops carrying chilled liquid ammonia solution, may be placed in the boreholes while they are still liquid but after the barrier is in place to prevent heat from the oil shale operation from liquefying the wax barrier. When the oil is fully extracted and the heat subsides, the chilling may be turned off and the wax will maintain the barrier in perpetuity without any further energy input or maintenance.

After wax treatment of a borehole is complete, the molten wax in the borehole may be displaced back to the surface by grout or water and reclaimed. The open hole may be left full of air or water and also may be equipped with sensors for leak detection. If the wax is displaced back to the surface with air or nitrogen gas the absence of water inflow will provide some evidence that at least the wellbore has been sealed. Leaks between adjacent boreholes due to insufficient wax permeation may be identified by temperature differential or by electrical conductivity across the barrier. The wax permeated rock will have a much lower electrical conductivity so a borehole outside the perimeter and inside the perimeter could be used to make a measurement.

Leaks may be identified with some precision by temperature measurements after the water table within the perimeter is drawn down prior to oil shale heating. Leaks in the barrier will allow cold formation water to cross the barrier. Substantial flows will cause a local temperature drop over time that can be detected by temperature sensors in the wells. Even before the main heating begins, water inflow will be colder than the ambient temperature of the heated rock which surrounds wells that have just received wax infusion. Vertical intervals where the wellbore is not as hot as other places may indicate an insufficiently heated area or an area that did not receive enough wax. It may even be possible to perform an infrared thermal survey of the wellbore indicate if there is more heat in the direction of the barrier than perpendicular to the barrier. The wellbore surface closest to the adjacent wellbore should cool more slowly than the portion away from the line of the barrier. A temperature profile by depth of the well should be sufficient to indicate areas where leaks may exist. Such potential leaks could be repaired by circulating additional molten wax in the well for an extended period of months.

Wax Identity

Wax is a waterproof substance that is a solid or plastic semisolid at ambient temperature and that, on being subjected to slightly higher temperatures, becomes a low viscosity liquid. The chemical composition of waxes is complex; all of the products have relatively wide molecular weight profiles, with the functionality ranging from products, which contain mainly normal alkanes to those which are mixtures of hydrocarbons and reactive functional species. Common waxes include refined paraffin, slack wax, petrolatum, crude petrolatum, microcrystalline wax, polyethylene, alpha olefin, plant derived wax, coal derived wax, and wax refined from solid hydrocarbon deposits such as oil shale. Acceptable waxes include WAXFIX 123™, WAXFIX 125™, WAXFIX 145™ and WAXFIX166™ which are commercially available products from M-I L.L.C. of Houston, Tex. and are proprietary wax blends with nominal melting points of 123 F, 125 F, 145 F, and 166 F, respectively. Molten WAXFIX products are 15 to 20 percent lighter than water. WAXFIX products include surfactants and wetting agents that comprise less than one percent of the total mass.

The wax to be used in subterranean barrier work is selected based on local availability and cost as well as physical properties. Any type of natural or manmade thermoplastic may be used in the process if its properties are suitable. Branched chain wax such as crude petrolatum may be preferred for its resistance to biological attack and its resistance to cracking. Straight chain waxes such as paraffin may be preferred for low viscosity and lower melting point. Synthetic wax such as alpha olefin may be utilized as well. Branched chain or microcrystalline waxes are preferred for their higher melt temperature that may allow them to be used at greater depth. Various types of wax may be blended to achieve ideal properties. Blends of materials that are only partially refined such as slack wax with crude petrolatum are generally lower in cost and work as well.

Adding a surfactant to the wax is desirable to maximize permeation and improve wax wetting of soil and rock that contains water. When forming barriers below the water table, hot air injection as described above may be useful for driving water from the formation. Heating the formation and its water above the melting point of the wax will allow emulsification of the water as droplets of water inside a molten wax liquid phase. If the water droplets within this emulsion are sufficiently small, the emulsion can penetrate the formation. As the formation becomes wetted with molten wax, additional penetration will be possible and less water will flow into the borehole. Surfactant materials that function only at the temperatures of molten wax are preferred since it is desired that the final condition of the formation be impermeable to both water and oil. Conventional dewatering of the wells prior to and during the pre-heating process may be desirable to maximize penetration into the formation. The preferred method is to drive as much water from the formation as possible and then use surfactant modified wax to help displace the water and oil wet the formation. If the formation is fully saturated with water and quite permeable to water, injection of the molten wax under pressure into the upper portion of the preheated and water-filled borehole, allows the molten wax, which is lighter than water, to form distinct interface above the water, as the pressurized hydrostatic head of wax displaces the water column downward and outward into the porosity of the formation.

Additional information regarding suitable waxes may be obtained within U.S. Pat. No. 6,860,936, which is incorporated by reference in its entirety.

The foregoing description of preferred and other embodiments is not intended to limit or restrict the scope or applicability of the inventive concepts conceived of by the Applicant. In exchange for disclosing the inventive concepts contained herein, the Applicant desires all patent rights afforded by the appended claims. Therefore, it is intended that the disclosed methods include all modifications and alterations to the full extent that they come within the scope of the following claims or the equivalents thereof.

What is claimed is:

1. A method of creating and filling a subterranean cut comprising the steps of:
   a) drilling a row of holes tracing the path of a desired cut;
   b) preparing two pipes, wherein each pipe has at least one pulley fixed to its distal end and arranged to conduct an abrasive cable saw along at least part of the length of each pipe and between the distal ends of the two pipes, wherein the abrasive cable saw extends along at least a part of the length of each pipe to a drive means located substantially at the surface;
   c) simultaneously pushing the two pipes into two adjacent holes while circulating the abrasive cable saw such that a cut is formed between the two holes as the pipes are simultaneously pushed through the adjacent holes; and
   d) pumping a grouting material into at least one of the holes, wherein the grouting material can circulate to other holes along the path of the desired cut, wherein the grouting material provides lubrication for the pipes and the cable saw and facilitates removal of cuttings.

2. The method of claim 1, wherein at least some of the holes are at least partially horizontal and pass under a volume of land to be isolated.

3. The method of claim 2, wherein the at least some of the holes returns to the surface at the opposite side of the land to be isolated, wherein the desired cut between traces the path of a desired subterranean barrier in the shape of a basin.

4. The method of claim 1, wherein the row of holes are substantially vertical holes.

5. The method of claim 1, wherein the grouting material is a thermoplastic.

6. The method of claim 1, wherein the grouting material is a molten wax.

7. The method of claim 1, wherein the grouting material is a cement and bentonite based grout.

8. A method of constructing an impermeable barrier comprising the steps of:
   a) directionally drilling a hole through a formation along a desired path of the barrier, and extending the hole back to the earth surface at a distal end of the hole;
   b) positioning an abrasive cable saw in the hole such that it passes through each end of the hole;
   c) positioning a pulley near each end of the hole;
   d) threading the abrasive cable saw through the pulleys to a drive means;
   e) tensioning and circulating the abrasive cable saw such that it forms a cut through the formation; and
   f) conveying a thermoplastic grouting material through the hole, wherein the grouting material fills the cut and facilitates removal of cuttings.

9. The method of claim 8, wherein the hole is heated before introducing the grouting material.

10. The method of claim 8, wherein at least one end of the hole is cased so that the grouting material may be supplied under pressure.

11. The method of claim 8, wherein pressure is applied to the grouting material to prevent ground water from entering the hole.

12. The method of claim 8, wherein pressure is applied to the grouting material to hold the cut open.

13. A method of constructing an impermeable barrier comprising the steps of:
   a) directionally drilling a hole through a formation along a desired path of the barrier, and extending the hole back to the earth surface at a distal end of the hole;
   b) positioning an abrasive cable saw in the hole such that it passes through each end of the hole;
   c) positioning a pulley near each end of the hole;
   d) threading the abrasive cable saw through the pulleys to a drive means;
   e) tensioning and circulating the abrasive cable saw such that it forms a cut through the formation; and
   f) conveying a molten wax grouting material through the hole, wherein the grouting material fills the cut and facilitates removal of cuttings.

14. The method of claim 13, wherein the hole is heated before introducing the grouting material.

15. The method of claim 13, wherein at least one end of the hole is cased so that the grouting material may be supplied under pressure.

16. The method of claim 13, wherein pressure is applied to the grouting material to prevent ground water from entering the hole.

17. The method of claim 13, wherein pressure is applied to the grouting material to hold the cut open.

18. A method of constructing an impermeable barrier comprising the steps of:
   a) directionally drilling a hole through a formation along a desired path of the barrier, and extending the hole back to the earth surface at a distal end of the hole;
   b) positioning an abrasive cable saw in the hole such that it passes through each end of the hole;
   c) positioning a pulley near each end of the hole;
   d) threading the abrasive cable saw through the pulleys to a drive means;
   e) tensioning and circulating the abrasive cable saw such that it forms a cut through the formation; and
   f) conveying a cement and bentonite based grouting material through the hole, wherein the grouting material fills the cut and facilitates removal of cuttings.

19. The method of claim 18, wherein the hole is heated before introducing the grouting material.

20. The method of claim 18, wherein at least one end of the hole is cased so that the grouting material may be supplied under pressure.

21. The method of claim 18, wherein pressure is applied to the grouting material to prevent ground water from entering the hole.

22. The method of claim 18, wherein pressure is applied to the grouting material to hold the cut open.

\* \* \* \* \*